US006586909B1

United States Patent
Trepka

(10) Patent No.: US 6,586,909 B1
(45) Date of Patent: Jul. 1, 2003

(54) PARALLEL BATTERY CHARGING DEVICE

(76) Inventor: Ron Trepka, 4474 S. Hills Dr., Cleveland, OH (US) 44109-4479

( * ) Notice: Subject to any disclaimer, the term of this patent is extended or adjusted under 35 U.S.C. 154(b) by 0 days.

(21) Appl. No.: 10/028,464

(22) Filed: Dec. 21, 2001

(51) Int. Cl.[7] .............................................. H01M 10/46
(52) U.S. Cl. ...................................... 320/108; 320/119
(58) Field of Search ................................ 320/103, 104, 320/108, 112, 116, 118, 119, 120, 123, 132, 137, 138, 126

(56) References Cited

U.S. PATENT DOCUMENTS

| | | | |
|---|---|---|---|
| 3,694,729 A | 9/1972 | Jones | 307/150 |
| 3,890,556 A | 6/1975 | Melling et al. | 320/21 |
| 3,936,718 A | 2/1976 | Melling et al. | 320/20 |
| 4,237,409 A | 12/1980 | Suglaski | 320/2 |
| 4,322,685 A | 3/1982 | Frailing et al. | 324/429 |
| 5,010,399 A | 4/1991 | Goodman et al. | 358/85 |
| 5,190,833 A | 3/1993 | Goldstein et al. | 429/27 |
| 5,306,579 A | 4/1994 | Shepard, Jr. et al. | 429/40 |
| 5,341,083 A | 8/1994 | Klontz et al. | 320/2 |
| 5,360,680 A | 11/1994 | Goldman et al. | 429/27 |
| 5,418,080 A | 5/1995 | Korall et al. | 429/27 |
| 5,436,087 A | 7/1995 | Tomazic | 429/50 |
| 5,554,918 A | 9/1996 | Harats et al. | 320/2 |
| 5,568,353 A | 10/1996 | Bai et al. | 361/523 |
| 5,569,551 A | 10/1996 | Pedicini et al. | 429/27 |
| 5,569,555 A | 10/1996 | Goldstein et al. | 429/49 |
| 5,599,637 A | 2/1997 | Pecherer et al. | 429/27 |
| 5,639,568 A | 6/1997 | Pedicini et al. | 429/27 |
| 5,757,163 A | 5/1998 | Brotto et al. | 320/155 |
| 5,844,325 A | 12/1998 | Waugh et al. | 307/10.7 |
| 5,920,179 A | 7/1999 | Pedicini | 320/122 |
| 6,051,328 A | 4/2000 | Witzigreuter et al. | 429/27 |

OTHER PUBLICATIONS

John C. Tanner, Disposable Batteries: A surprising turn in the future of portable power, printed May 10, 2001 from Internet Website http://www.americasnetwork.com/issues/2000supplements/2000.../3g20002022_disposable.html.
Zinc Air Batteries, printed May 10, 2001 from Internet Website http://energy-sales.com/zincair.html.
Our Story: New Opportunities, printed May 10, 2001 from Internet Website http://www.aern.com/comp_story.html.
Diffusion Air Manager Technology: Pathway for Significant Performance Improvements and New Applications for Metal–Air Batteries, printed May 10, 2001 from Internet Website http://www.aern.com/damwp93.html.
State–of–the–Art in Air Mover Design for Zinc–Air Batteries, Apr. 25, 2001, AER Energy Resources, Inc.
Prototype 4 Volt Primary Zinc–air Battery: Model 4V04, printed May 10, 2001 from Internet Website http://www.aern.com/model4v04_spec.html.
Prototype Primary Zinc–Air Cell: Model 3355, Part No. PR3355, printed May 10, 2001 from Internet Website http://www.aern.com/model3355_spec.html.

(List continued on next page.)

Primary Examiner—Edward H. Tso
(74) Attorney, Agent, or Firm—Renner, Otto, Boisselle & Sklar, LLP

(57) ABSTRACT

A battery charging device for simultaneously charging the cells of a multi-cell battery in parallel wherein an induction coil distributes and isolates the charging energy to each cell. The parallel battery charger may be used with any battery having common two-electrode cells without breaking the inter-cell connections. Additionally, each cell may include a third or charging electrode that is used exclusively for charging. Each cell of this type of battery is charged by coupling a third electrode and a bifunctional electrode in parallel with the battery charger.

20 Claims, 5 Drawing Sheets

OTHER PUBLICATIONS

Available Prototypes: Latest Technology, printed May 10, 2001 from Internet Website http://www.aern.com/proto-main.html.

Available Services: Opportunities for You, printed May 10, 2001 from Internet Website http://www.aern.com/techlicensingmain.html.

International Patents, printed May 10, 2001 from Internet Website http://www.aern.com/intpatent.html.

How It Works: Zinc–Air, printed May 10, 2001 from Internet Website http://www.aern.com/zinc_howworks2.html.

A Comparison: Zinc–Air, printed May 10, 2001 from Internet Website http://www.aern.com/comparison.html.

Differences: Zinc–Air, printed May 10, 2001 from Internet Website http://www.aern.com/differences.html.

Benefits: Zinc–Air, printed May 10, 2001 from Internet Website http://www.aern.com/zinc_benefits.html.

Density and Storage Advantages: Zinc–Air, printed May 10, 2001 from Internet Website http://www.aern.com/density.html.

Low Self–Discharge Rate: Zinc–Air, printed May 10, 2001 from Internet Website http://www.aern.com/discharge.html.

Low Cost Potential: Zinc–Air, printed May 10, 2001 from Internet Website http://www.aern.com/lowcost.html.

Environmentally Sound: Zinc–Air, printed May 10, 2001 from Internet Website http://www.aern.com/envsound.html.

Added Benefits: AER's Results, printed May 10, 2001 from Internet Website http://www.aern.com/zinc_addedbenefits.html.

Potential Markets: For Primary Zinc–Air, printed May 10, 2001 from Internet Website http://www.aern.com/zinc_potmarkets.html.

Battery Technology Has Staying Power, printed May 10, 2001 from Internet Website http://www.aern.com/batt-main.html.

Types/Tradeoffs: A Comprehensive Comparison, printed May 10, 2001 from Internet Website http://www.aern.com/batt_typetradeoff.html.

Market Factors: Diversity, printed May 10, 2001 from Internet Website http://www.aern.com/batt_mktfactors.html.

About Electric Fuel, printed May 10, 2001 from Internet Website http://www.electric–fuel.com/compro/index.shtml.

Regeneration, printed May 10, 2001 from Internet Website http://www.electric–fuel.com/techno/regennew.shtml.

Jonathan R. Goldstein et al., Electric Fuel™ Zinc–Air Battery Regeneration Technology, presented at "The 1995 Annual Meeting of the Applied Electrochemistry Division of the German Chemical Society," Duisberg, Germany, Sep. 27–29, 1995.

Yehuda Harats et al., The Electric Fuel™ System Solution for an Electric Vehicle, presented at "Batterien und Batteriemanagement" Conference, Essen, Germany, Feb. 22–23, 1995.

Binyamin Koretz et al., Operational Aspects of the Electric Fuel™ Zinc–Air Battery System for EV's, presented at "The 12$^{th}$ International Seminar on Primary and Secondary Battery Technology and Application," Deerfield Beach, Florida, Mar. 6–9, 1995.

Ken Hawk, All About Batteries, printed May 10, 2001 from Internet Website http://www.frogpondgroup.com/articles.cfm?articled=khawk02.html.

Mike Mayor, Portable Chargers To Power PDAs, printed May 10, 2001 from Internet Website http://www.wirelessnewsfactor.com/perl/story/8614.html.

Electric Fuel—Profile, printed May 10, 2001 from Internet Website http://business.com/directory/electronics_and_semiconductors/electronic_comp.../profile.html.

Jonathan Goldstein et al., New Developments in the Electric Fuel Zinc–Air System, presented at "International Power Sources Symposium," 1999. No date.

Binyamin Koretz et al., Regeneration of Zinc Anodes for the Electric Fuel® Zinc–Air Refuelable EV Battery System.

Electrical Engineering article, pp. 15–9 through 15–14. No date.

PARALLEL BATTERY CHARGING DEVICE

FIELD OF THE INVENTION

The present invention generally relates to a device and method for charging electrochemical cells of a multi-cell battery or the simultaneous charging of multiple batteries. In particular, the invention relates to charging a battery with multiple cells wherein each cell includes a third or charging electrode that is used exclusively for charging. Each cell of the battery is charged simultaneously by coupling a third electrode and a bifunctional electrode in parallel with the battery charger. An induction coil distributes and isolates the charging energy to each cell. The cells of the battery, typically wired in series, require no disassembly for charging. The battery charger is be used with a metal-air battery to prolong the life of the cathode but may also be used to charge common two-electrode multi-cell batteries in parallel without breaking the inter-cell connections. It may also be used to charge a plurality of conventional two-terminal batteries wired in parallel.

BACKGROUND OF THE INVENTION

Generally, battery packs include several battery cells connected in series. Ideally, each of the battery cells within a battery pack will have similar charging, discharging, and efficiency characteristics. However, this ideal scenario is not normally encountered. Thus, a battery pack ordinarily contains several multiple battery cells with each battery cell having different charging characteristics. This condition may produce many problems related to the overcharging and undercharging of the battery cells. For instance, fully charging one battery cell in a battery pack and continuing to charge it may result in overcharging and damage to the fully charged cell. Likewise, ending a charge cycle when only one battery cell is fully charged may result in undercharging one or more of the other battery cells in the battery pack. Therefore, there is a need for a system to provide an isolated charging cycle that accommodates multiple battery cells having varying charging characteristics.

The present invention relates generally to a method and apparatus for rapidly and safely charging a plurality of battery cells from a single power supply. Given the anticipated proliferation of electric vehicles including electric scooters, it will be necessary to have a reasonably standardized recharging apparatus located at, for instance, the vehicle operator's residence, place of business, parking garage, recharge station, and the like. Additionally, the same design may be used to simultaneously charge multiple batteries for portable devices such as personal computers, cellular phones, and the like.

Generally, there are two types of battery cells. Cells that are useful for only a single discharge cycle are called primary cells, and cells that are rechargeable and useful for multiple discharge cycles are called secondary cells. There are many varieties of secondary cells including the common lead-acid and nickel-cadmium (ni-cad) batteries and the less common metal-air batteries such as the zinc-air battery disclosed in patent application Ser. No. 09/552,870, herein incorporated by reference.

Battery packs comprised of metal-air cells provide a relatively light-weight power supply. Metal-air cells utilize oxygen from ambient air as a reactant in an electrochemical reaction. Metal-air cells include an air permeable electrode as the cathode and a metallic anode surrounded by an aqueous electrolyte and function through the reduction of oxygen from the ambient air which reacts with the metal to generate an electric current. For example, in a zinc-air cell, the anode contains zinc, and during operation, oxygen from the ambient air along with water and electrons present in the cell are converted at the cathode to hydroxyl ions. Conversely, at the anode zinc atoms and hydroxyl ions are converted to zinc oxide and water, which releases the electrons used at the cathode portion of the cell. Thus, the cathode and anode act in concert to generate electrical energy.

Metal-air batteries may be charged mechanically and electrically. Mechanical charging is accomplished by physically replacing the electrolyte, the electrodes, or a combination thereof. (For example, see U.S. Pat. Nos. 5,569,555; 5,418,080; 5,360,680; and 5,554,918). Such a charging method requires special equipment, special skills, an inventory of electrolyte and electrodes, and a plan for storing and disposing of hazardous chemicals. Conversely, electrical recharging avoids these disadvantages. The electrically rechargeable metal-air cell is recharged by applying a charging voltage between the anode and cathode of the cell and reversing the electrochemical reaction. During recharging, the cell discharges oxygen to the atmosphere through a vent.

While clean and efficient, electrical charging of a conventional multi-cell battery does have some other disadvantages. In particular, most multi-cell batteries are designed such that the cells are connected in "series" such that the discharge voltage between the battery terminals may be increased. For example, a 12-volt battery is normally comprised of 6 battery cells, each producing 2 volts, wired end-to-end in "series" to provide 12 volts across the two battery terminals. Such a configuration may be electrically recharged by applying a charging voltage across the two battery terminals to reverse the electrochemical process that occurs on discharge. When connected for charging in this fashion, each battery cell wired in series, necessarily receives the identical current flow regardless of its current state of charge and ability to convert this energy to electrochemical storage.

By forcing the same charging current to each cell, charging the battery cells in series is disadvantageous. During the electrochemical recharge cycle of a battery cell, the cell passes through several stages of charging. It is well known that during charging, a phenomenon known as "gassing" occurs, that is to say, the battery electrolyte dissociates into gaseous components which may emanate as bubbles. It is usually desirable to reduce the battery charging current during "gassing" so as to avoid damage to the electrode which would otherwise be caused by maintaining the charging current at the higher levels permissible in the "pre-gassing" or "bulk-charge" phase of charging. Thus, it is desired that the battery charger provide a separate charging circuit to each battery cell such that the charging current may by optimized for each stage of a cell's charging cycle.

It remains that the two-electrode cells of conventional batteries, connected in "series," cannot be charged "conventionally" through separate charging circuits as the cells are linked end-to-end. Such batteries may charged in parallel by a conventional battery charger only if the inter-cell connections or links are broken or disconnected. In this manner, each cell is independent and separate charging circuits may be attached to each cell.

In the metal-air battery arena, there are two main types of electrically rechargeable batteries. One type includes those with three electrodes for each cell, namely, a bifunctional anode, a discharge cathode, and a charging-electrode (i.e. a third electrode). The discharge cathode is designed to optimize the discharge cycle of the metal-air cell and may be incapable of recharging the cell. Instead, the charging-electrode is used to recharge the metal-air cell. Another type of metal-air cell includes two electrodes, both electrodes being bifunctional. The bifunctional electrodes function in both the discharge mode and the charge mode of the cell, thus eliminating the need for a third electrode. Bifunctional electrodes, however, suffer from a major drawback; they do not last long because the charging cycle deteriorates the discharge system (i.e., bifunctional electrodes suffer from decreasing performance as the number of discharge/charge cycles increase). In some cases as the voltage creeps up the cell may develop a short circuit as a result of a zinc dendrite forming a metallic bridge to the positive electrode, and will consequently cease to function even though the cathode is in good condition and capable of further service.

Thus, tri-electrode cells are advantageous when compared to two-electrode cells in that they offer more stable performance over a greater number of discharge/recharge cycles. In view of the above and the increased availability of tri-electrode batteries, there is a need in the art for an improved battery charging device and method for charging each of the battery cells independently and simultaneously.

The need for an improved battery charging device with cell balancing is illustrated by the following scenario. For example, a battery with four cells intended to be identical typically are not identical for many reasons. In a metal-air cell, the electrolyte may not wet the entire anode thereby leaving useable material isolated. Through cycling, the zinc can become detached from the current collector and become isolated. The resulting parasitic loss may not be equal and some cells will self discharge differently. During discharge, one or more cells will determine the end of discharge. The remaining cells will have some residual energy but cannot be discharged in series as that would damage the empty cell(s). On the next charge cycle, the cell with the most residual charge will be fully charged prior to the other cells, if the cells are charged in series. Further series charging may damage the fully charged cell and the remaining cells are denied a full charge. As the process continues, the cells unbalance further and each cycle capacity is reduced. FIG. 3A shows a set of nickle cadmium cells that are unbalanced by 10 ampere-hours. In this case, 3 ampere-hours is restored to the unbalance after charging.

SUMMARY OF THE INVENTION

This invention relates to a parallel charging system for a multi-cell battery wherein each battery cell may or may not include a third charging electrode. The charging electrode eliminates the need to disconnect cells for parallel charging. The parallel charging system disclosed herein can provide the same function. The invention allows for cell charging via the respective charging electrodes without breaking inter-cell connections. Further, the invention provides for isolation of each charging circuit and battery cell by employing an induction core operatively coupled to each cell. Each cell may be connected to the induction core such that the charging current is provided to each cell independent of the other cells via a separate circuit. The induction core automatically balances the current to each cell based on the cell's ability to draw current. More current is provided to the cells with a lower charge level and voltage.

In the simplest form, cell balancing is achieved using transformer theory. A load on a secondary winding is reflected to the primary winding by the transformer's turn ratio. Each secondary winding reflects it's load and if the transformer is tightly coupled, each secondary winding appears as if it were connected in parallel. Each secondary winding draws power as if it was connected to a single supply. This configuration does not require a regulator but just a diode set and a shunt for current measurement. This simple configuration is useful and cost effective as it requires no extra components and performs the required cell balance.

For example, as shown in FIG. 1, the invention allows for parallel charging of a multi-cell battery wherein the battery cells incorporate a separate or third charging electrode in addition to conventional positive and negative discharge electrodes.

The present invention affords for such charging through a charging electrode without the breaking of inter-cell connections. This is accomplished by providing the charging energy through an induction coil so as to provide electrical isolation of each cell. In addition, the present invention may be employed to charge several two-terminal batteries simultaneously regardless of whether they are multi-cell batteries or single cell batteries.

The present invention may also be employed to parallel charge the cells of a conventional two-electrode cell battery without requiring disconnection of the battery cells. As described herein, the isolation of the secondary windings of the transformer allows the parallel battery charger disclosed to be used where a conventional parallel charger would fail.

The present invention also provides a battery charger for charging through a third electrode (i.e. a charging-electrode) used in metal-air cell batteries. Such third electrodes may be formed from a mixture of an lanthanum nickel compound and at least one metal oxide, and support structure. The present invention provides a charging system and method for metal-air cells that provides stable performance over a large number of charge/discharge cycles. The result is improved metal-air battery performance and improved battery life.

Additionally, when employed in vehicular applications, a braking energy recovery device may be included in the charging system to allow for conversion of kinetic energy back into electrochemical storage in a electrochemical/mechanical system.

In one embodiment, the present invention relates to a battery charging system that isolates the parallel charging of each individual cell using an induction coil.

In another embodiment, the present invention relates to a battery charging system that balances the parallel charging of each individual cell using an induction coil and incorporates a current sensor to determine the end charge of each cell and further may include a top-off timer.

In another embodiment, the present invention relates to a battery charger that allows balanced parallel charging to each cell of a conventional multi-cell battery with two-electrode cells without breaking the intercell connections.

In another embodiment, the present invention relates to a battery charging system that balances the parallel charging of each individual cell using an induction coil and recaptures the braking energy for use in battery charging.

In another embodiment, the present invention relates to the parallel battery charging system for simultaneously charging several conventional two terminal batteries in parallel.

In another embodiment, the present invention relates to a parallel battery charging system wherein current and voltage sensors are applied to each charging circuit and are used to control the charging cycle.

In another embodiment, the present invention relates to a method of charging any battery by parallel charging of each individual cell using an induction coil.

DETAILED DESCRIPTION

The present invention involves a system and method for charging multi-cell batteries using a parallel battery charger individually connected to each cell of a multi-cell battery. Such batteries may include metal-air batteries or any conventional multi-cell batteries without disconnecting the conductors that link the cells in series. Additionally, the parallel charging system may be used wherever several conventional batteries are to be charged and the isolation provided to each charging circuit by the induction loop is beneficial.

Figure 1:
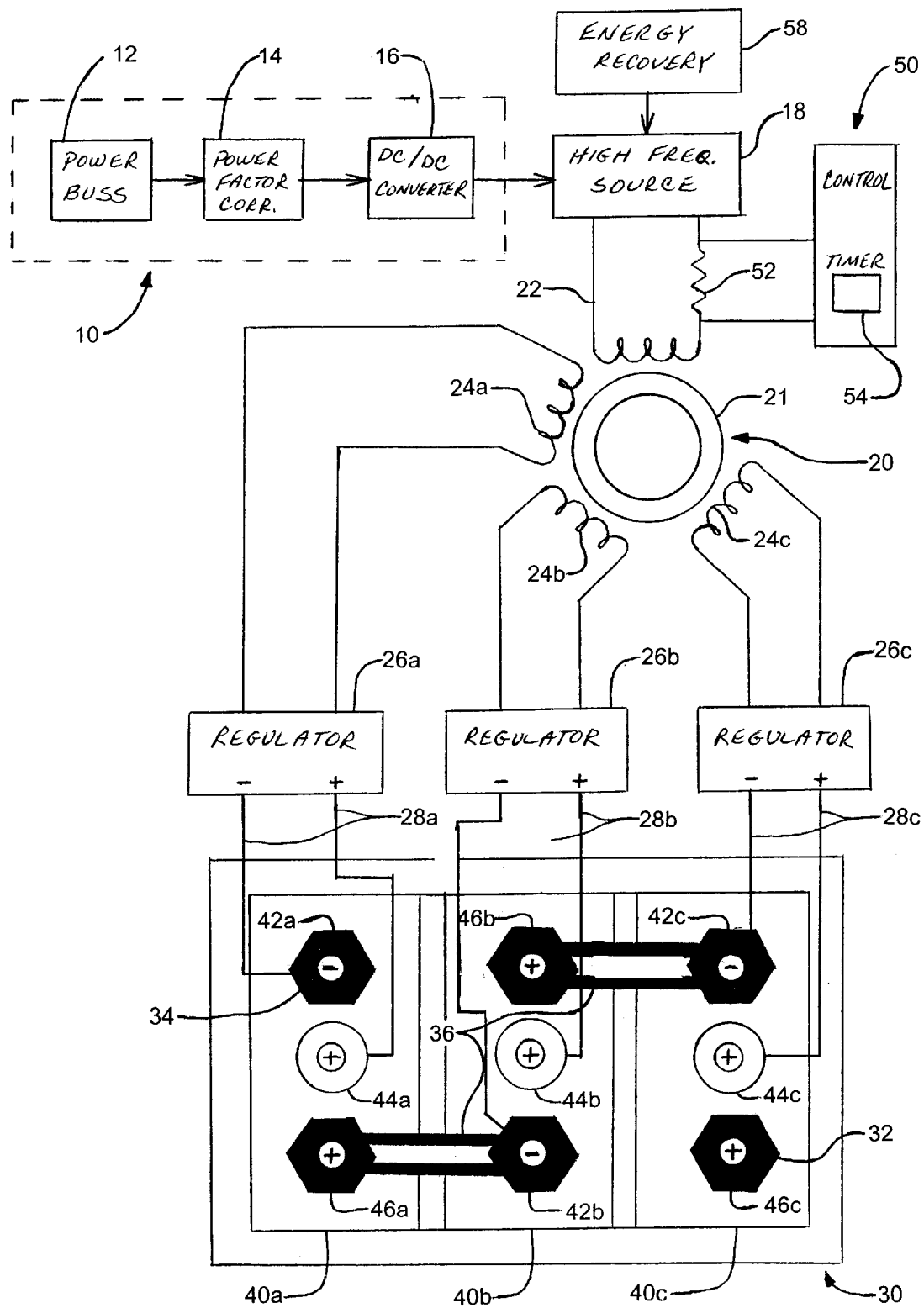
FIG. 1 is a schematic view of the structure of a parallel battery charger and an associated tri-electrode multicell battery in accordance with the present invention.

Referring initially to FIG. 1, FIG. 1 shows a diagramatic view of the structure of a parallel battery charging device 20 and an associated tri-electrode multi-cell battery 30 in accordance with the present invention. The first portion of the circuit, which is independent of the battery charging circuit, is a power source 10. The power source 10 includes an electrical energy supply such as an alternating current power buss 12. The source of alternating current could be a typical 110 volt, 60 hertz power outlet as is commonly available in the United States or could be a large power buss for charging cells in bulk. The power buss 12 is linked to a high power factor corrector 14 which may be a large coil or active corrector to bring the power factor to 1. For example, one may use a uc3854 manufactured by Texas Instruments or any similar device. The power is then supplied to an DC to DC converter 16 such as a uc3825 manufactured by Texas Instruments to prepare the DC power for use by the charging circuit.

Should the parallel battery charging device 20 be intended for use on a mobile vehicle, the components of the power source 10 may all be disposed separate from the vehicle. Such a configuration would reduce the overall weight of the vehicle and allow any properly chosen direct current source, including an offboard battery or solar energy source, to be used to charge the onboard batteries.

Alternatively, should ground support equipment be unavailable, the high power factor corrector 14 and an DC to DC converter 16 may be disposed in the vehicle to allow charging from any proper source of alternating current as noted above.

The power source 10 is connected to a high frequency source 18 to generate a high frequency waveform for use by a transformer. The waveform may be a pulse or square-wave generated by a LT 1162 Pulse Width Modulator and LT 1846 Integrated Circuit manufactured by Linear Technologies or equivalent. The operating frequency of the high frequency source may range from 20 KHZ. to 1,000 KHZ.

The high frequency source 18 supplies a multi-winding transformer for distribution to several battery cells for charging. A transformer is an electrical device that is used for the transmission and distribution of electrical energy. In principle, a transformer consists of a plurality of coils magnetically coupled to each other. One of the coils, known as a primary winding, receives electrical energy, which is converted to purely magnetic energy; the energy is continuously being delivered to the other coil, known as a secondary winding, in electrical form. A multi-winding transformer has two or more secondary windings on the same core. A four-winding transformer (shown in FIG. 1), for example, has a primary winding 22 and three secondary windings 24a, 24b, and 24c.

The primary winding or input coil 22 provides the electrical energy to create the magnetic flux in an induction core 21. Due to the magnetic coupling, a time-varying excitation applied to the primary winding 22 induces a similar time varying response in the secondary windings 24a–c. The transformer used for this application is a prototype design produced by Zinc Air Power Corporation of Strongsville, Ohio using common ferrite materials and conventional means as known in the art. Each secondary winding 24a, 24b, and 24c is isolated from one another and from the input coil 22. This isolation permits each battery cell charging circuit to draw the proper current for each of a plurality of battery cells 40a, 40b, and 40c. The three circuits are isolated so that the current draw of each battery cell does not affect the charging of the other cells.

The output coils 24a, 24b, and 24c are connected to a number of regulators 26a, 26b, and 26c respectively. The regulators 26a–c each convert the high frequency electrical energy back to a DC supply current at a voltage between 1.00 and 2.5 volts and regulate the current as required by each battery cell 40a–c. The isolation between the charging circuits allows independent control of the battery charging current and voltage. The regulators may be as simple as a diode placed between the output coil and the charging electrode or may be an active circuit. Using the simple diode form, cell charge balance is possible where each cell will draw it's portion of magnetic energy inversely proportional to it's state of charge. Each regulator 26a, 26b, and 26c is connected to the each of the battery cells 40a, 40b, and 40c via a number of cables 28a, 28b, and 28c wired in parallel. The positive output of each respective regulator 26a–c is attached to a charge electrode 44a–c of each of the three battery cells 40a–c. The negative or common lead of each respective regulator 26a–c is attached to a negative or common electrode 42a–c of each of the three battery cells 40a–c.

FIG. 1 also includes a diagramatic view of a tri-electrode battery 30 incorporating three independent battery cells 40a, 40b, and 40c connected in series using two series connectors 36. While the tri-electrode battery 30 shows three cells, any number of cells may be used to fit the application. Each cell 40a, 40b, and 40c of the tri-electrode battery 30 incorporates three electrodes. Referring specifically to battery cell 40a, a first or common electrode 42a is identified as synonymously with a negative terminal 34. The common electrode 42a is used for both charging in "parallel" and discharging in "series." In addition to the common electrode 42a, battery cell 40a includes a discharge electrode 46a. The discharge electrode 46a performs the normal electrochemical discharge function as in a conventional bi-electrode battery; it plays no role in electrochemical charging, thereby enhancing its life.

Unique to cell 40a of the tri-electrode battery 30 is an independent charge electrode 44a, which may be made in accordance with the metal-air battery invention disclosed in U.S. patent application Ser. No. 09/552,870. In that patent application, the third electrode of the battery cell may be positioned between the air electrode and the metal electrode. Alternatively, the metal electrode of the battery cell may be positioned between the air electrode and the third electrode to further increase in the power output of the battery cell by permitting an open separator to be used between the air electrode and the metal electrode.

The remaining structure of a typical tri-electrode battery cell is conventional in nature and is known to those skilled in the art. For example, see: Metal-Air Batteries by D P Gregory, BSG, PhD, published by Mills & Boon Limited, copyright 1972, which discloses secondary metal-air cells and is incorporated herein by reference.

The third electrode of the tri-electrode battery 30 contains numerous openings which permit the free flow of ions from the electrolyte between the air electrode and the metal electrode during the discharge cycle.

Figure 2:
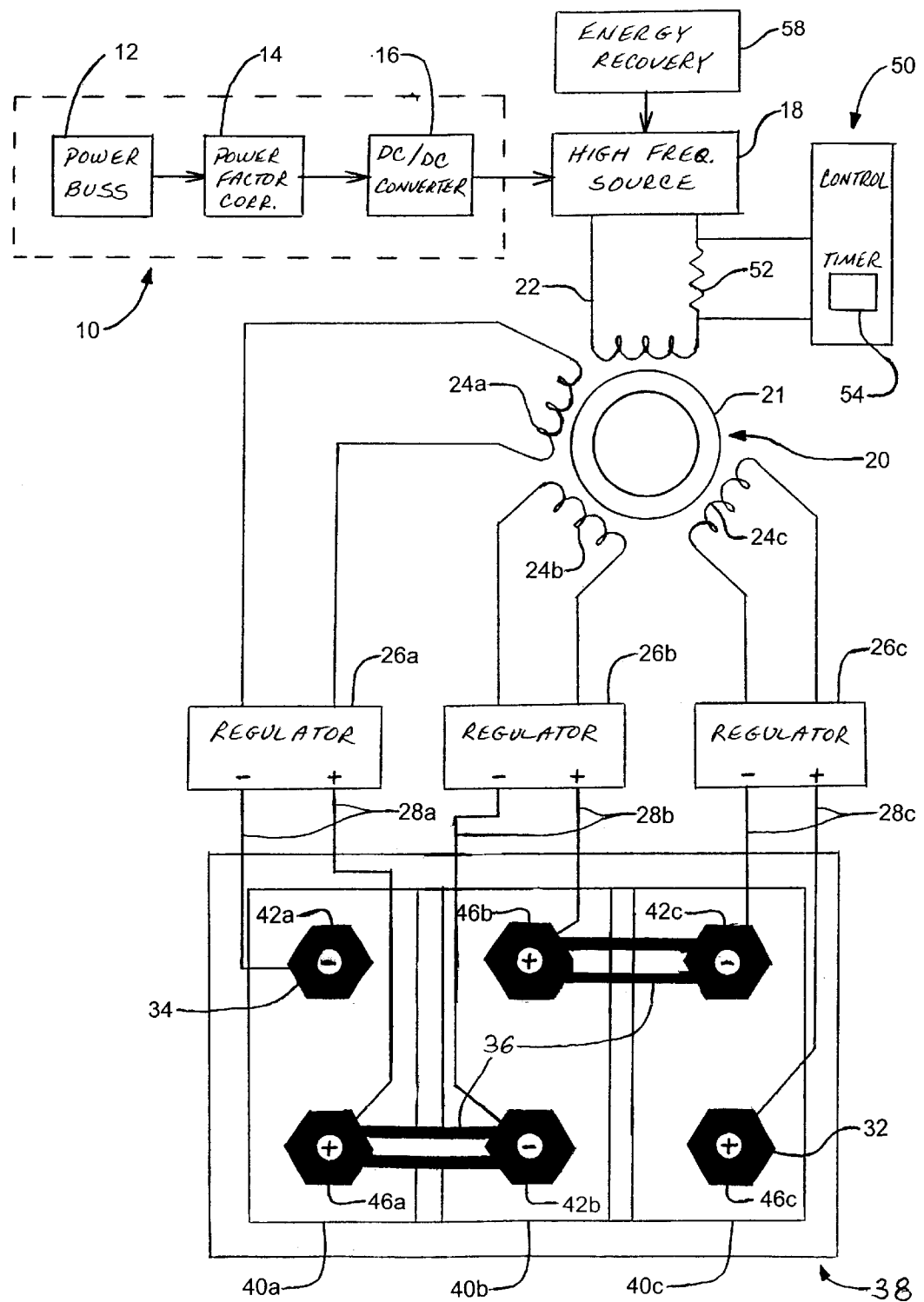
FIG. 2 is a schematic view of the structure of a parallel battery charger and an associated two-electrode multi-cell battery in accordance with the present invention.

By charging any conventional battery using the parallel battery charging device 20, the need to disconnect the series connectors 36 is eliminated. Such a configuration is shown in FIG. 2 where the parallel battery charging device 20 is used to charge a conventional two-electrode, multi-cell battery 38 with series connections 36 connected. The parallel battery charging device 20 saves operator time (the series connections do not have to be disconnected) and reduces mechanical wear on the intra-battery terminals 42abc and 46abc.

Further, each battery cell 40abc may draw its optimum electrical current during the charging cycle independent of the other battery cells being charged. The present invention eliminates one of the major drawbacks of electrochemical charging the battery cells in series; they all receive the same current throughout the charging cycle.

Figure 3A:
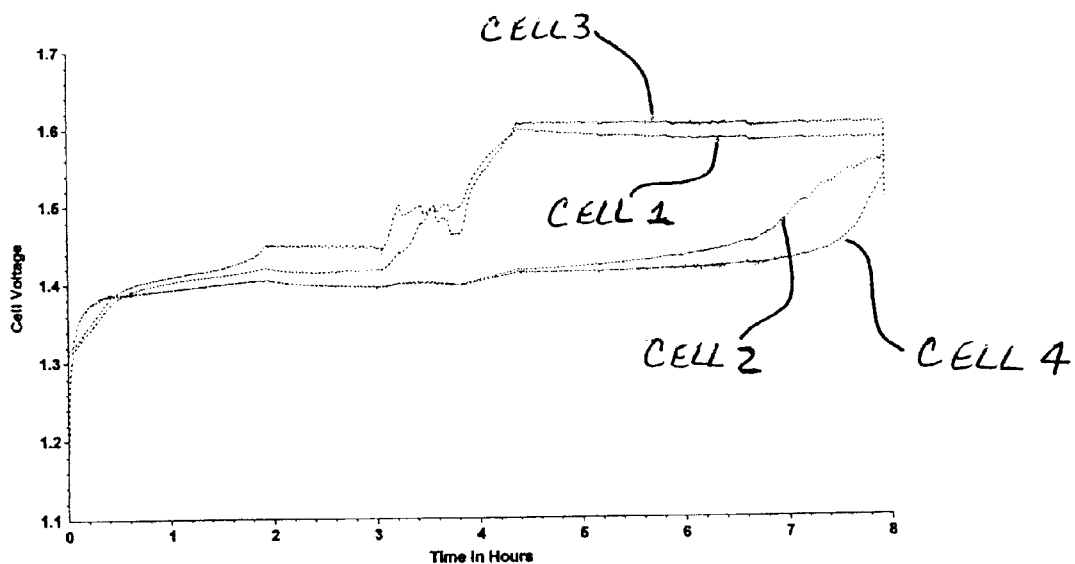
FIGS. 3A and 3B are typical graphs representing the charge and discharge performance of battery cells as detailed in the specification.
Figure 3B:
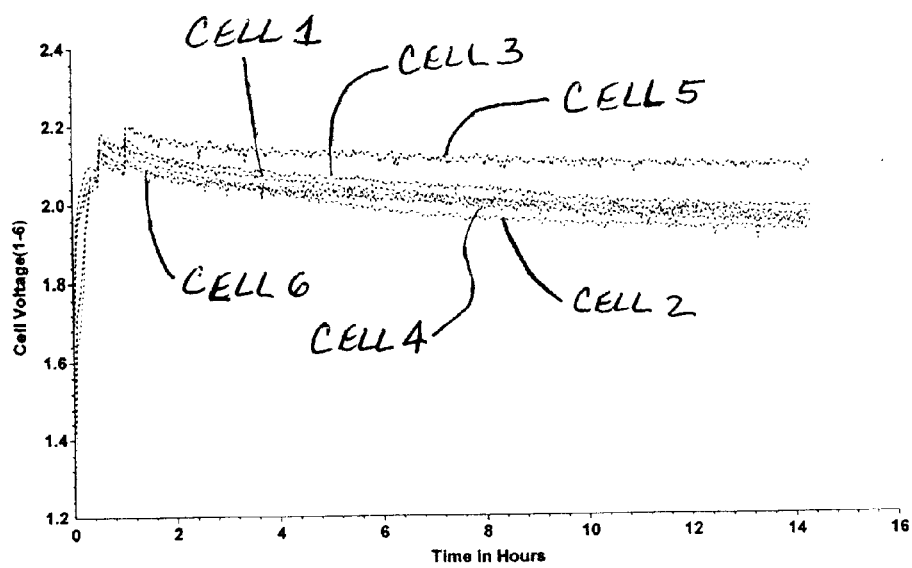

FIGS. 3A and 3B show typical graphs representing the charge cycles of two different multi-cell batteries. FIG. 3A shows a 32 ampere-hour nickel-cadmium set of cells that are unbalanced by 10 ampere-hours. Cells labeled 1 and 3 have a 10 ampere-hour charge at the beginning of the charge cycle. Cells labeled 2 and 4 are essentially discharged at the beginning of the charge cycle. The parallel battery charging device 20 provides balanced charging current to each cell during the charging cycle.

FIG. 3B shows a typical charging cycle of the parallel battery charging device 20 being used to charge six zinc-air cells incorporating a third electrode in accordance with the present invention. Specifically, this multi-cell battery containing the third electrode was subjected to 3 complete charge/discharge cycles. Each of the six charging curves in FIG. 3B show the charging voltage during the charge cycle.

In operation, while the induction core 21 isolates each battery charging circuit and the regulators 26abc monitor the voltage in each circuit, overall control of the charging device 20 is governed by a charge controller 50. The charge controller 50 may include two features: a top-off timer 54 and a current sensor 52. The top-off timer 54 provides an upper limit on the time for which the charger is applied to the battery cells. After the charge cycle proceeds for a predetermined period, the top-off timer 54 can terminate the charging process to prevent battery cell damage. Further, the current sensor 52 can monitor the total current provided to the input coil 22 and the charge controller 50 can terminate the charging process when the current draw required to the input coil 22 falls below a predetermined level.

Figure 4:
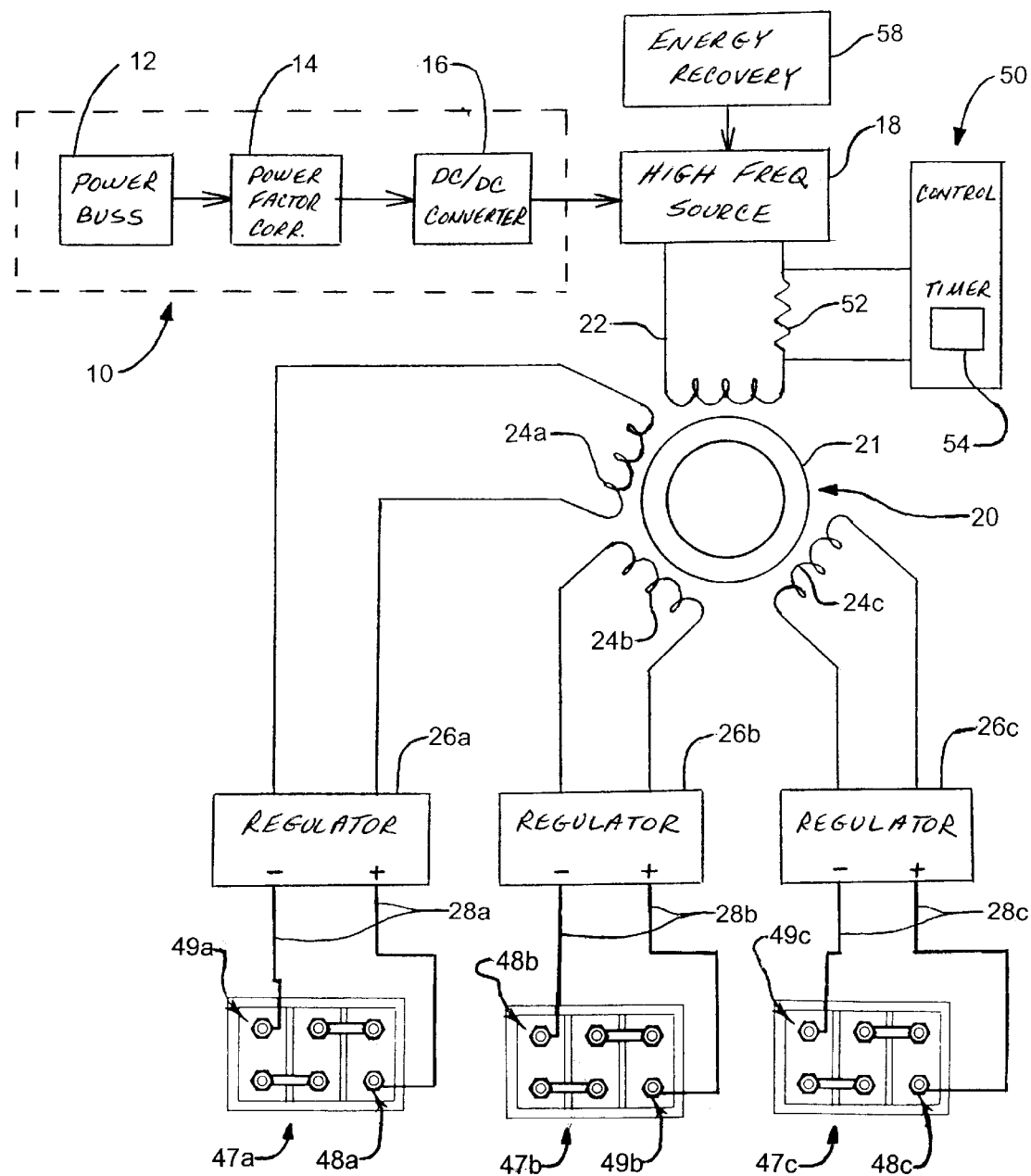
FIG. 4 is a schematic view of the structure of a parallel battery charger used to charge conventional two-terminal batteries simultaneously in accordance with the present invention.

In addition to the capability of parallel charging of individual battery cells of a tri-electrode battery, the present invention may be used to charge separate conventional batteries in parallel. As shown in FIG. 4, the parallel battery charging device 20 may be used to charge conventional two-terminal batteries 47abc, regardless of the number of cells comprising the battery. Each battery may be coupled via an individual regulator 26 and cable 28 in the same manner as the battery cells 40a–c of FIG. 1. The charging method maintains the same isolation properties to each charging circuit as are obtained when charging the tri-electrode battery cells.

Moreover, if the battery charging device is incorporated onto a vehicle, the system may further include a braking energy recovery device 58. Such a device converts the vehicle's kinetic energy into electrical energy by mechanically or electrically engaging a generator to the vehicle's drive-train upon application of the brakes. Typically, such a device is the vehicle's drive motor operated in reverse. Such a device assists the vehicle braking with the mechanical load of the generator while providing an electric current to the high frequency source 18 or into the DC to DC converter 16 if the device's output is alternating current. In any event, the device operates to recycle kinetic energy into electrochemical storage in the battery rather than to allow the energy to dissipate as heat.

Figure 5:
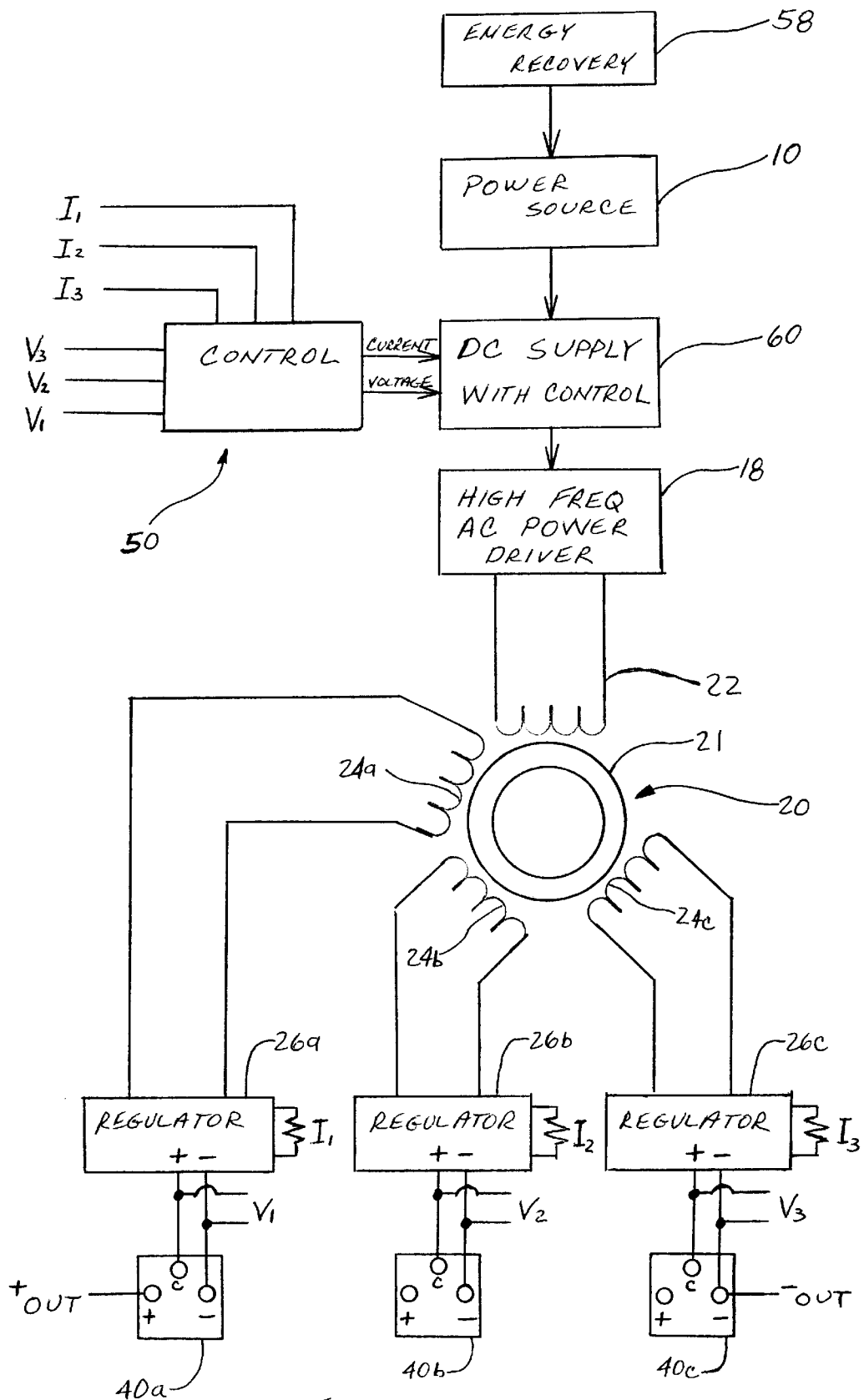
FIG. 5 is a schematic view of the structure of another embodiment of the parallel battery charger where the current and voltage is sensed at each cell in accordance with the present invention.

In another embodiment shown in FIG. 5, the current levels $I_1$, $I_2$, and $I_3$ and the voltages $V_1$, $V_2$, and $V_3$ are detected at each cell 40a, 40b, and 40c. The voltage and current levels provide feedback input to the controller 50 that controls the DC supply 60 to the high frequency source 18. This configuration provides an extensive number of ways to control the charging including statistical analysis on the cells'comparative health. If the characteristic voltage and current levels of a damaged cell are known, the damaged cell may be identified and the charging level is controlled accordingly or the cell is replaced as necessary. Additionally with such a configuration, it is possible to simultaneously charge and discharge individual cells.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms used to describe such components are intended to correspond, unless otherwise indicated, to any component which performs the specified function of the described component. In addition, while a particular feature of the invention may have been disclosed with respect to only one of several embodiments, such feature may be combined with one or more other features of the other embodiments as may be desired and advantageous for any given or particular application.

What is claimed is:

1. A battery charging system comprising:
   a parallel battery charging device comprising:
   an induction core;
   an input coil magnetically coupled to the induction core; and a plurality of output coils magnetically coupled to the induction core;

a plurality of regulators in communication with the plurality of output coils; and a plurality of cables extending in parallel between the plurality of regulators and a number of battery cells.

2. The battery charging system of claim 1 further comprising a high frequency source.

3. The battery charging system of claim 1 further comprising a charge controller.

4. The battery charging system of claim 3 wherein the charge controller includes a current sensor.

5. The battery charging system of claim 3 wherein the charge controller includes a top-off timer.

6. The battery charging system of claim 1 further comprising a power source.

7. The battery charging system of claim 6 further comprising a high frequency source and wherein the power source includes a high power factor corrector.

8. The battery charging system of claim 2 further comprising a braking energy recovery device.

9. The battery charging system of claim 1 further comprising a tri-electrode multi-cell battery.

10. The battery charging system of claim 7 further comprising a charge controller having a current sensor.

11. The battery charging system of claim 10 wherein the charge controller includes a top-off timer.

12. A parallel battery charging system comprising:

a power source;

a high frequency source;

a charge controller;

a transformer; and a plurality of charging circuits coupling the transformer to a plurality of battery cells in parallel.

13. The battery charging system of claim 12 further including voltage and current sensors in each charging circuit.

14. The battery charging system of claim 12 wherein the plurality of charging circuits include a plurality of regulators and a plurality of cables for connection to the plurality of battery cells.

15. The battery charging system of claim 12 wherein the transformer includes an input coil, an induction core, and a plurality of output coils.

16. The battery charging system of claim 13 wherein the charge controller regulates a DC supply source using the voltage and current values from each charging circuit.

17. The battery charging system of claim 12 wherein the power source includes a high power factor corrector and an DC to DC converter; wherein the charge controller includes a current sensor and a top-off timer; wherein the transformer includes an input coil, an induction core, and a plurality of output coils; and wherein the plurality of charging circuits include a plurality of regulators and a plurality of cables for connection to the plurality of battery cells.

18. A rechargeble power system for an electric vehicle comprising:

a high frequency source;

a transformer;

a tri-electrode multi-cell battery;

a plurality of charging circuits in parallel connection between the transformer and a plurality of cells of the tri-electrode multi-cell battery; and a braking energy recovery device.

19. The rechargeble power system of claim 18 further comprising a charge controller that uses current and voltage feedback from each charging circuit to regulate the power to the transformer.

20. The rechargeble power system of claim 19 wherein the transformer includes: an input coil, an induction core, and a plurality of output coils coupled to the plurality of charging circuits.

* * * * *